United States Patent
Kiarostami et al.

(10) Patent No.: US 11,273,685 B2
(45) Date of Patent: Mar. 15, 2022

(54) COMPOSITE AUXILIARY DIESEL HEATER AND METHOD OF OPERATING SAME

(71) Applicant: International Thermal Research Ltd., Richmond (CA)

(72) Inventors: Nader Kiarostami, Richmond (CA); Victor William Johnson, Richmond (CA); Reza Sonavi, Vancouver (CA)

(73) Assignee: INTERNATIONAL THERMAL INVESTMENTS LTD., Richmond (CA)

( * ) Notice: Subject to any disclaimer, the term of this patent is extended or adjusted under 35 U.S.C. 154(b) by 251 days.

(21) Appl. No.: 15/253,347

(22) Filed: Aug. 31, 2016

(65) Prior Publication Data
US 2018/0056751 A1    Mar. 1, 2018

(51) Int. Cl.
*B60H 1/22* (2006.01)
*B60H 1/00* (2006.01)

(52) U.S. Cl.
CPC ....... *B60H 1/2209* (2013.01); *B60H 1/00364* (2013.01); *B60H 2001/2234* (2013.01); *B60H 2001/2278* (2013.01); *B60H 2001/2293* (2013.01)

(58) Field of Classification Search
USPC ........................................................ 237/5
See application file for complete search history.

(56) References Cited

U.S. PATENT DOCUMENTS

| | | | | |
|---|---|---|---|---|
| 5,025,985 A | * | 6/1991 | Enander | B60H 1/00364 237/12.3 B |
| 5,063,513 A | * | 11/1991 | Shank | B60H 1/2206 123/142.5 E |
| 5,067,652 A | * | 11/1991 | Enander | B60H 1/00364 237/12.3 B |
| 5,435,485 A | * | 7/1995 | Atterbury | F24F 3/06 237/2 B |
| 7,284,710 B2 | * | 10/2007 | Rixen | B60H 1/00364 237/12.3 B |
| 8,403,234 B2 | * | 3/2013 | Wolter | B60H 1/00364 123/142.5 R |
| 9,074,779 B2 | * | 7/2015 | Robinson | F24H 1/287 |
| 2005/0139690 A1 | * | 6/2005 | Wilnechenko | F28D 9/0093 237/12 |

(Continued)

*Primary Examiner* — Steven B McAllister
*Assistant Examiner* — John E Bargero
(74) *Attorney, Agent, or Firm* — John Russell Uren

(57) ABSTRACT

An auxiliary heater with a casing enclosing internal components which components include a heat exchanger separate from and outside the coolant tank and wherein two coolant loops each have their own coolant pumps and wherein a potable water loop exchanges heat with coolant within the heat exchanger. A control circuit provides enhanced coolant flow through the heat exchanger when the call for hot water is significant without significantly reducing the temperature of the hot water being used. A level switch within the coolant tank prevents coolant pumps from running without pump coolant and a filling and air purging operation improves the initial filling operation of the auxiliary heater with coolant and also prevents the coolant pump from running dry. A user switch may dedicate the hot coolant from the coolant tank to either the production of hot potable water or it may share both hot water and space heating.

1 Claim, 17 Drawing Sheets

(56) References Cited

U.S. PATENT DOCUMENTS

| | | | | |
|---|---|---|---|---|
| 2005/0247446 | A1* | 11/2005 | Gawthrop | B60H 1/004 165/202 |
| 2006/0196955 | A1* | 9/2006 | Moxon | B60H 1/2206 237/34 |
| 2007/0214816 | A1* | 9/2007 | Fukunaga | F24H 4/04 62/238.6 |
| 2009/0179079 | A1* | 7/2009 | Ruijven | F24H 1/009 237/12.3 B |
| 2014/0103128 | A1* | 4/2014 | Patel | B60H 1/00885 237/5 |
| 2015/0114317 | A1* | 4/2015 | Johnson | F24H 1/009 122/17.2 |
| 2015/0165871 | A1* | 6/2015 | Miller | B60H 1/032 237/28 |
| 2015/0298523 | A1* | 10/2015 | Patel | B60H 1/00778 237/2 A |
| 2016/0068043 | A1* | 3/2016 | Djermester | B60H 1/03 237/5 |

\* cited by examiner ature of the coolant in the coolant tank. As the coolant heat is transferred to the potable hot water within the heat exchanger, the aquastat senses the temperature of the coolant as it decreases. When the coolant temperature reaches the predetermined lower temperature, the aquastat closes and a pump passes heated coolant to the heat exchanger and thence to the potable water thereby to provide heat to the potable water and increase its temperature. However, due to the time lag from the start of the significant hot water demand to the time when the tank coolant begins to pass coolant heat to the potable water in the heat exchanger, the temperature of the potable water emanating from the shower may decrease before the heater coolant passes sufficient heat to the potable water. This may lead to a cooler shower temperature for a short duration which may be uncomfortable to the user.

COMPOSITE AUXILIARY DIESEL HEATER AND METHOD OF OPERATING SAME

This invention relates to diesel heaters and, more particularly, to an auxiliary diesel heater specifically designed for use in vehicles and boats and, more particularly, designed for use in larger diesel fueled recreational vehicles.

BACKGROUND OF THE INVENTION

Auxiliary heaters for motorhomes are, of course, known. They are used for supplementing the heat obtained from the engine of the vehicle in order to heat coolant and hot potable water for interior heating, showers, faucets, washing machines and the like in such recreational vehicles. In some instances, the auxiliary heater may be used to provide hot coolant to an engine loop for preheating the engine prior to starting the engine which assists the engine starting process particularly in cooler temperatures and which reduces engine wear. Such examples of auxiliary heating units are shown in U.S. Pat. No. 5,067,652.

In our U.S. Pat. No. 9,074,779 (Robinson et al) entitled DISTRIBUTION MODULE FOR WATER HEATER, there is described and illustrated an auxiliary heater which utilizes a separate distribution module associated with the auxiliary heater. The distribution module offers flexibility in plumbing layouts for motorhome designers since the pumps and heat exchangers are located separate from the heater itself. This reduces the size of the auxiliary heater and allows the distribution module to be positioned wherever it may be convenient to do so in such vehicles.

Nevertheless, there are advantages in combining the distribution module and the auxiliary heater into a single package. First, the overall weight of the auxiliary heater is reduced due to the need for only a single casing to house the components, particularly the heat exchangers which are otherwise located externally of the coolant tank. Second, servicing is made more convenient since all components may be located in a single casing and, third, although the size of the auxiliary heater is increased, it is not increased disproportionately and may usually be located within the same position as the smaller auxiliary heater associated with the separately located distribution module. This allows greater production speed for heater installation.

In addition to the single or composite unit comprising the auxiliary heater, certain additional improvements have also been incorporated into the auxiliary heater according to the present invention.

When the auxiliary heater is initially installed into the recreational vehicle, it is necessary to ensure air is removed from the coolant and potable water lines. This is done by running the coolant through the circulation system until the air is purged from the respective circuits. A plurality of pumps are used to pump coolant through the various circuits. An overflow bottle is generally located above the coolant tank and any fluid expansion is contained within the overflow bottle. The pumps require the coolant fluid to act as a lubricant during their pumping action and to absorb the heat generated by the pumps while under operation. If there is no fluid present or if the air is not totally removed from the coolant circuit, the pumps may overheat and/or run dry due to the lack of coolant which may cause damage to their operating components. This can result in inconvenient heater shutdowns and costly pump replacement.

When a significant call for hot water is made, such as a user commencing a shower, a thermostatic type analog transducer, commonly called an aquastat, senses the tem- The filling and air purging operation can be difficult to perform and if the coolant pumps are located at a position which is higher than the inlet of the initial coolant filling operation, the air purging sometimes is inconsistent. If air enters the coolant system, it can reduce movement of the coolant or prevent its movement altogether which adversely affects the heat output of the system. This is disadvantageous.

The low pressure fuel system used in some auxiliary heaters, particularly those heaters sold under the trademarks OASIS and HURRICANE which are manufactured by International Thermal Research Ltd. of Richmond, British Columbia, is usefully made more powerful for certain applications requiring additional power such as when calls for additional hot water or coolant are made. This may occur when the auxiliary heater is installed in larger motor homes or boats where there may be multiple sinks, bathrooms or showers. It would be desirable to facilitate the increase in power from such a low pressure system using enhanced fuel and air delivery to the burner in the auxiliary heater.

SUMMARY OF THE INVENTION

According to a first aspect of the invention, there is provided an auxiliary heater comprising a casing, a burner assembly within said casing, means to initiate combustion within said burner assembly, an exhaust manifold extending from said burner assembly to the outside of said auxiliary heater to allow passage of combustion products to the atmosphere, a first pump to provide heated coolant to a first coolant loop being a space heating loop from a coolant tank, a second pump to provide heated coolant from said coolant tank to a second coolant loop being a space heating loop and a third pump to provide heated coolant to a heat exchanger located externally of said coolant tank and to heat potable water used for a motor home, boat or shelter.

According to a second aspect of the invention there is provided apparatus to improve air purging in a coolant or potable water circuit and to fill a coolant tank, said apparatus comprising a filling and purge pump operable to be removably connected to a source of tank coolant at an outlet of said filling and purge pump and to an inlet of a coolant circuit at an outlet of said filling and purge pump, an overflow bottle operably connected to an outlet of said coolant tank, a level switch within said coolant tank, an overflow container connected to said coolant tank with a predetermined level noted thereon, and a bypass switch to allow operation of a coolant pump to circulate said coolant through a coolant loop.

According to a further aspect of the invention, there is provided apparatus to provide protection to coolant pumps when coolant is not present in sufficient quantities within said coolant tank, said apparatus comprising a level switch to monitor the level of coolant within said coolant tank and to sense when said level of coolant drops to less than a predetermined value, said level switch being operable to terminate operation of at least one of said pumps when said level of coolant drops to less than said predetermined value.

According to yet a further aspect of the invention, there is provided a burner assembly for an auxiliary heater, said burner assembly comprising a burner tube within which combustion occurs, an aspirating nozzle included within a nozzle holder, said nozzle being operable to emit atomised fuel and air into said burner tube, a source of fuel for said burner, a fuel pump to pump said fuel from said source of fuel to a fuel regulator, a solenoid between said fuel regulator and said nozzle to restrict fuel flow to said nozzle when said combustion within said burner tube is terminated, a source of combustion air for said burner tube to support said combustion in said burner tube, an air supply for said nozzle, said aspirating nozzle being adapted to utilize said air supply to suction fuel into said nozzle and to emit atomised fuel and air into said burner tube, an igniter to initiate combustion of said atomised fuel and air within said burner tube and a flame sensor operable to monitor a flame during which said combustion occurs within said burner tube, said air supply for said nozzle being at least two compressors each emitting air and which air is provided to said nozzle in a single stream which is a combination of the air of said at least two compressors and a fan to supply said combustion air to said burner tube to support said combustion.

According to yet a further aspect of the invention, there is disclosed a switch operable to select either hot coolant from a coolant tank flowing to a first heat exchanger which exchanges heat with potable water and with no hot coolant flowing to a coolant circuit which allows space heating within a vehicle or boat or to select both hot coolant from said coolant tank flowing to said first heat exchanger to exchange heat with said potable water within said first heat exchanger and to said coolant circuit which allows space heating within said vehicle or boat.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1A:
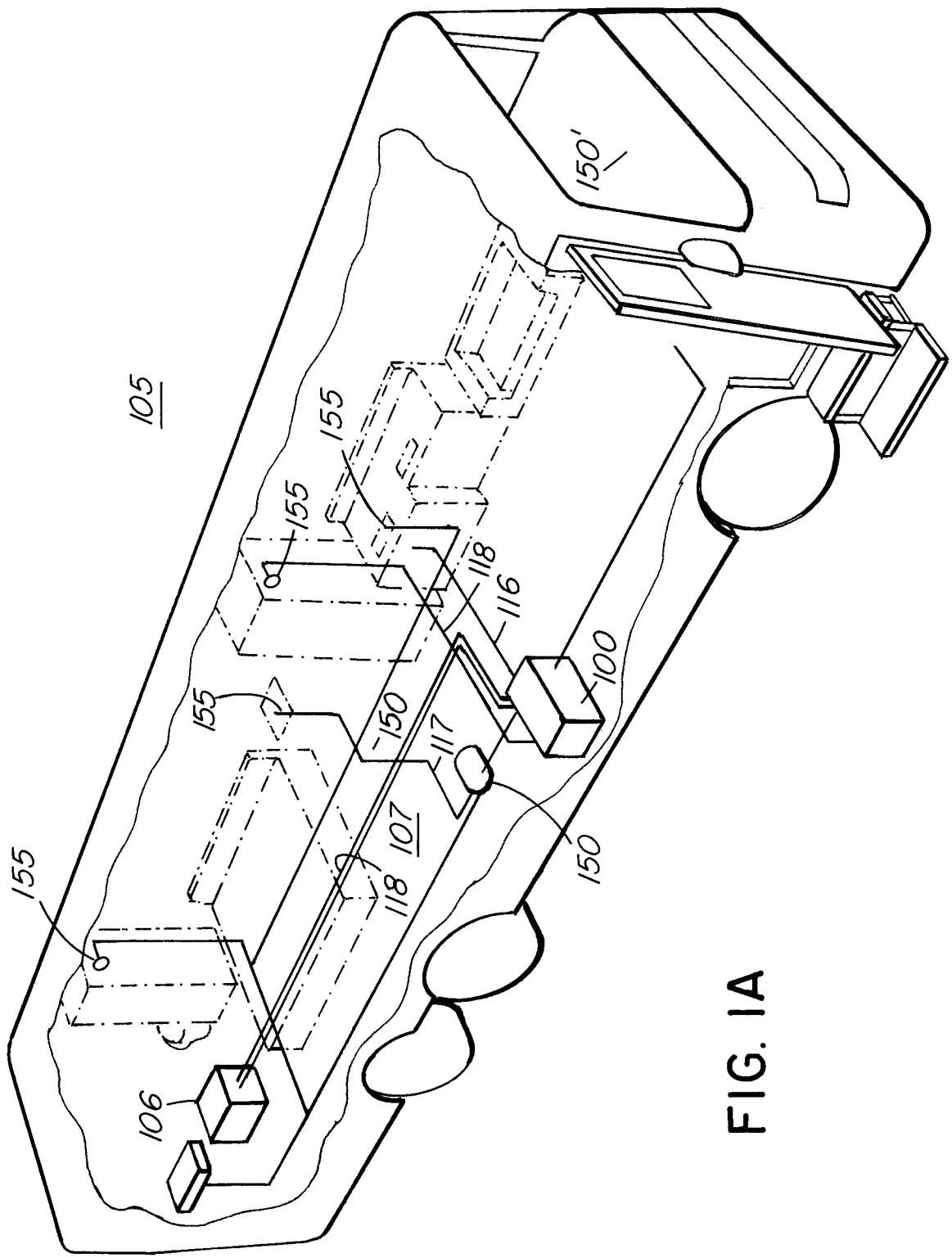
FIG. 1A is a diagrammatic isometric view of a motor coach or recreational vehicle (RV) particularly illustrating the auxiliary heater according to the invention and the coolant and potable water circuits connected thereto.

Referring now to the drawings, a motor coach or recreational vehicle is illustrated in cutaway generally at 105 in FIG. 1A. It includes an engine 106, conveniently diesel or bio-diesel powered, an interior area generally illustrated at 107 with furniture and appliances, and an auxiliary heater 100 according to the invention as will be described.

There are three (3) circuits emanating from the auxiliary heater 100, namely loop 1 coolant circuit 117, loop 2 coolant circuit 116, engine coolant circuit 118 and potable water circuit 119. The loop 1 and loop 2 coolant circuits 116, 117 are under the control of a zone control board 185 (FIG. 4) which also provides control for the cabin fans 150.

Figure 1B:
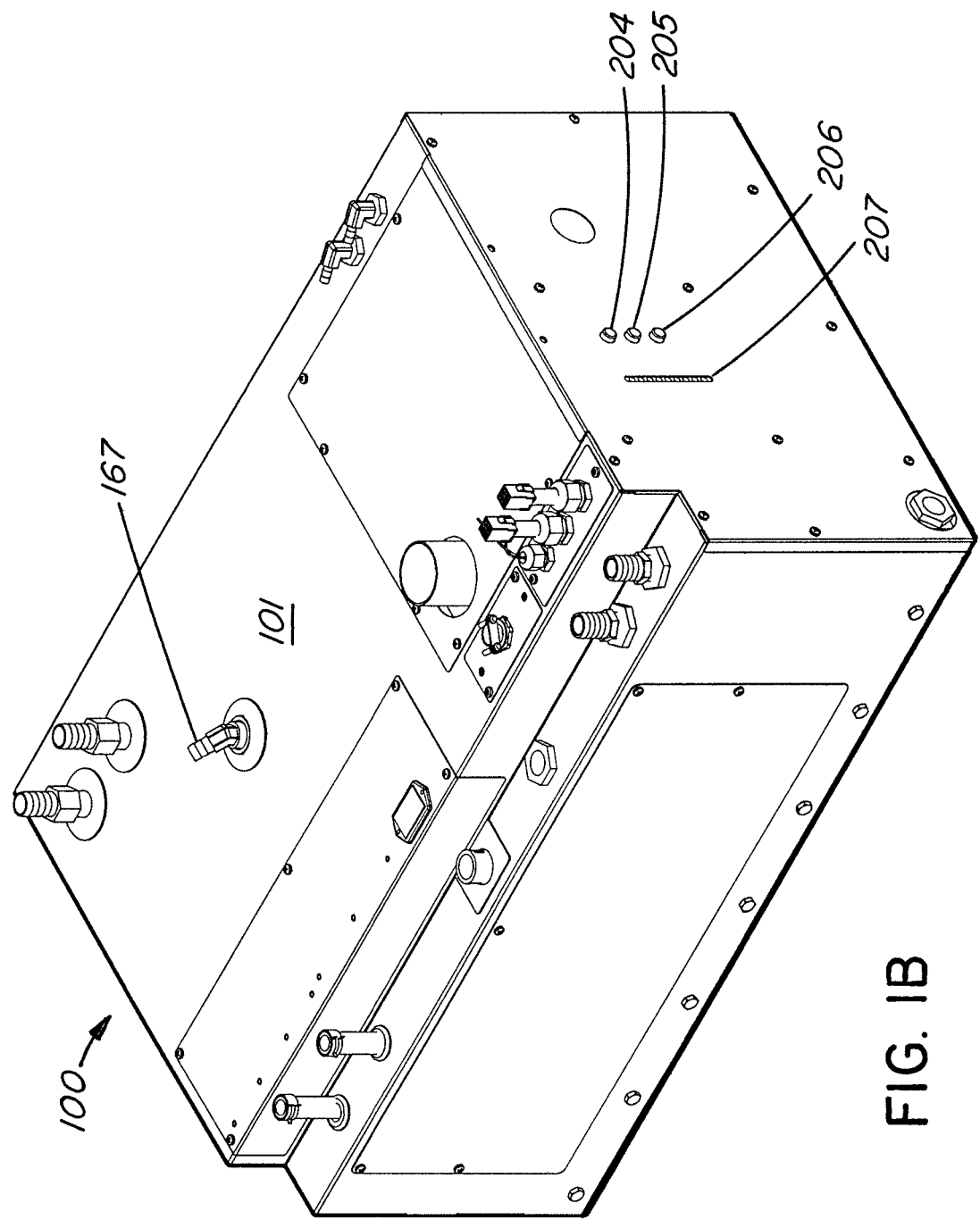
FIG. 1B is a diagrammatic isometric view of the auxiliary heater of FIG. 1 according to the invention illustrated within its casing.
Figure 2A:
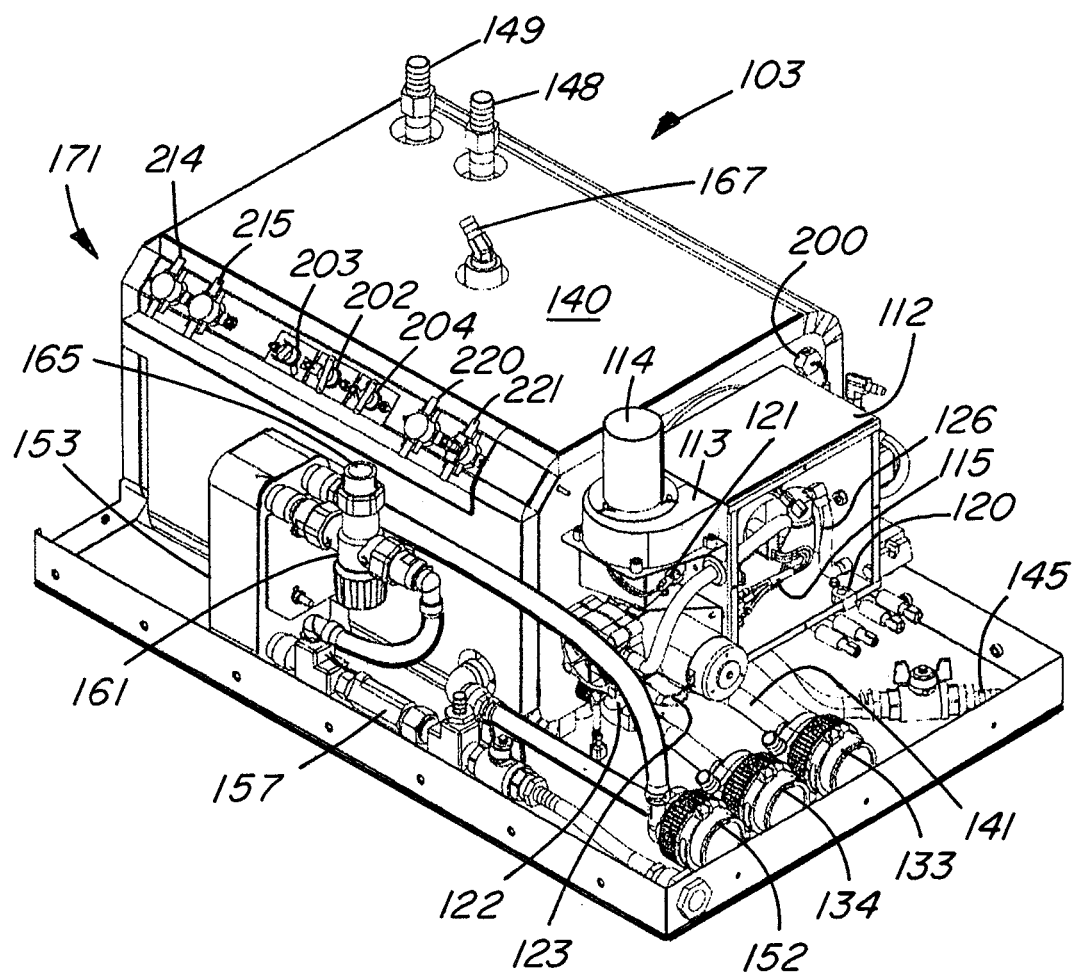
FIG. 2A is a diagrammatic isometric view of a first embodiment of the auxiliary heater according to the invention with the casing removed and with multiple internal components illustrated.
Figure 2D:
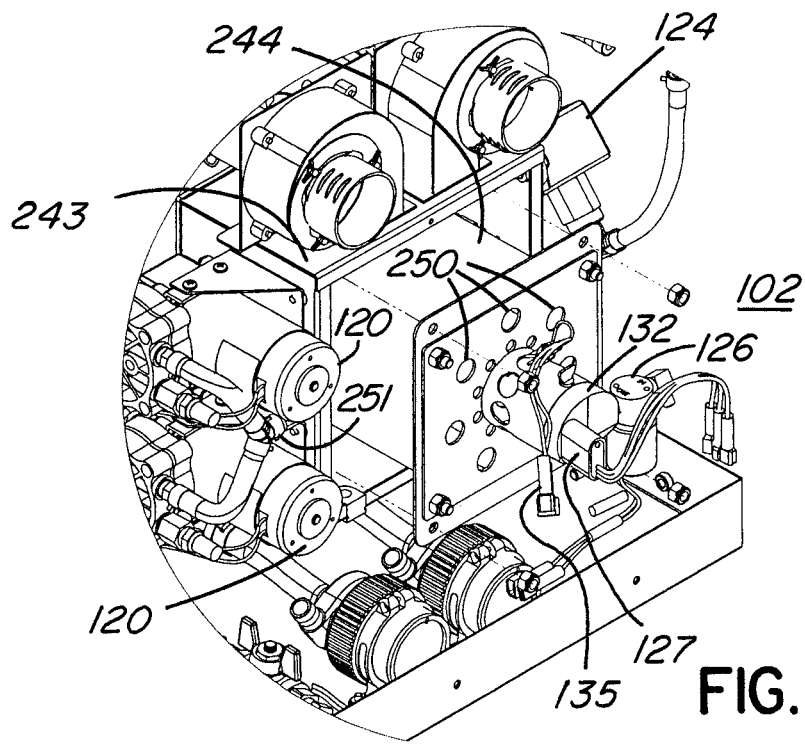
FIG. 2D is a diagrammatic isometric enlarged front view of the frontal area of FIG. 2B.
Figure 2B:
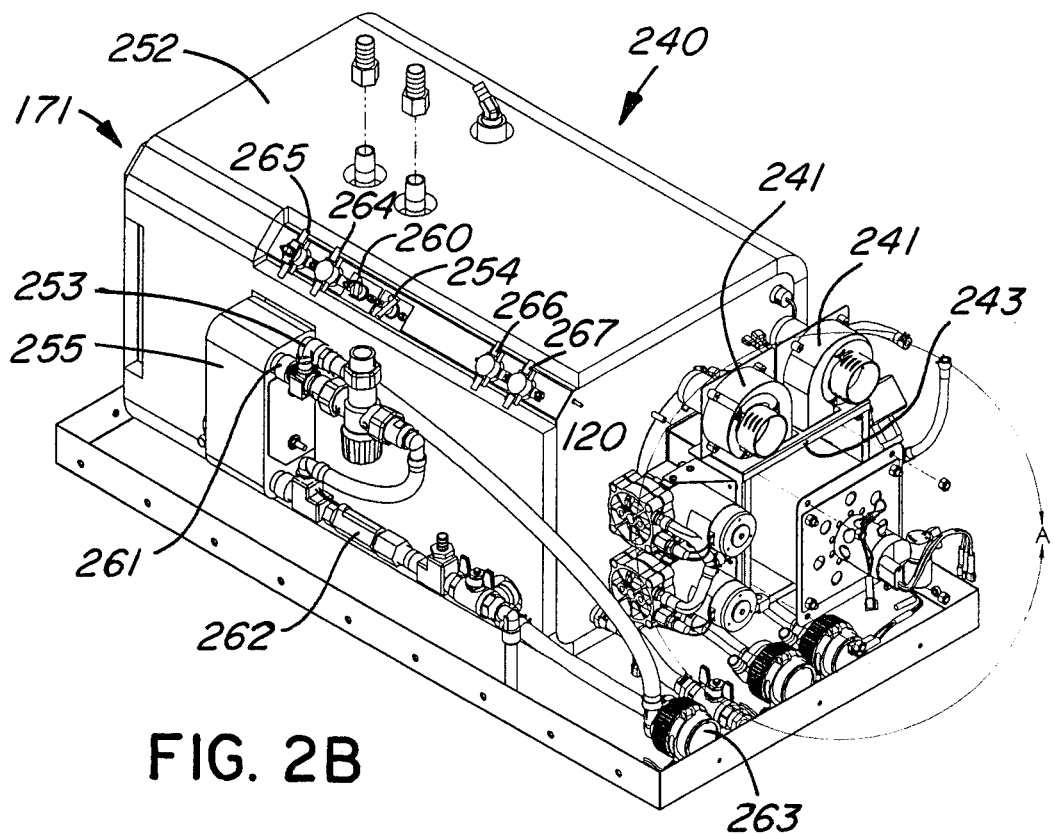
FIG. 2B is a diagrammatic isometric view of a second embodiment of the auxiliary heater according to the invention with the casing removed and illustrating multiple internal components and including an exploded view of the burner assembly.
Figure 2C:
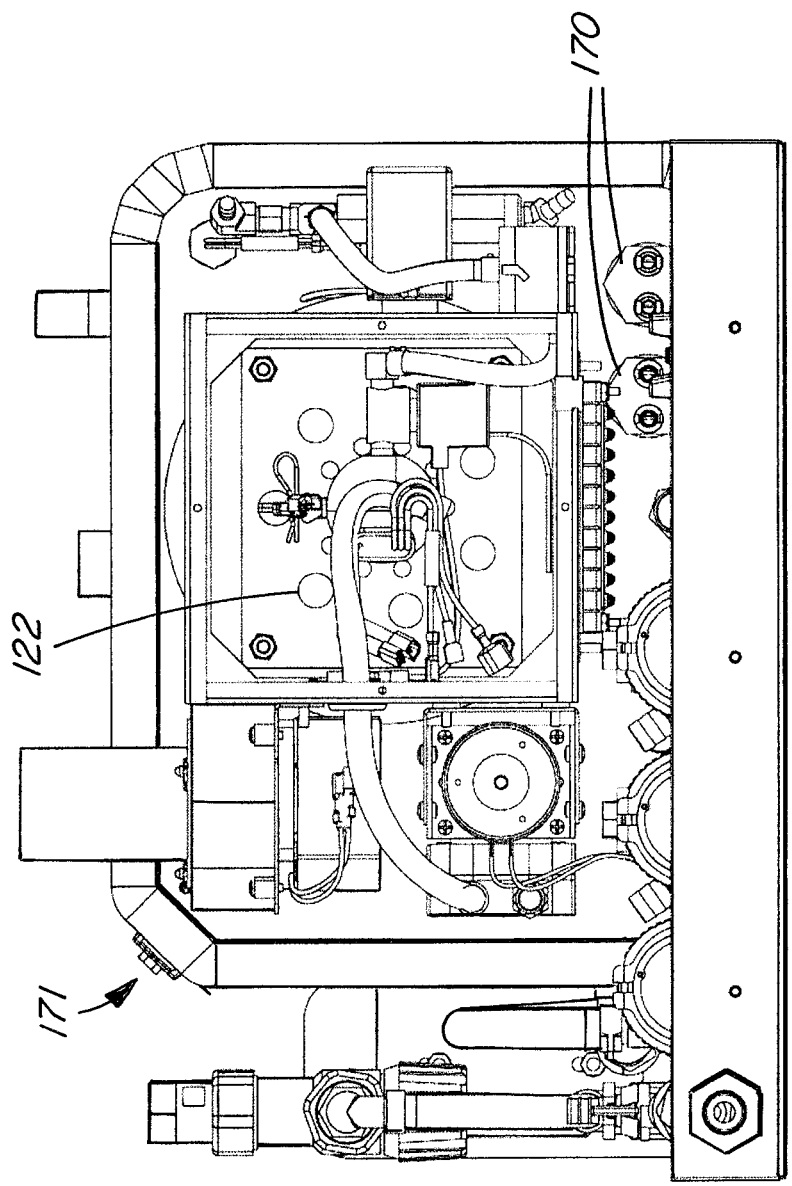
FIG. 2C is a diagrammatic isometric front view of the auxiliary heater of FIG. 2A particularly illustrating the burner box with its cover removed.

The auxiliary heater 100 is shown in greater detail in FIGS. 1B, 2A and 2C. The auxiliary heater 100 includes a casing generally illustrated at 101 (FIG. 1B) which protects and covers various of the internally located operating components as will be described and which has cutouts or openings in various locations for access to the power ON/OFF switch 201, the BYPASS switch 205, the RESET switch 206 and the LED lights 207 which are visible to the user and which allow troubleshooting or diagnosis of the operation of the auxiliary heater 100.

Figure 4:
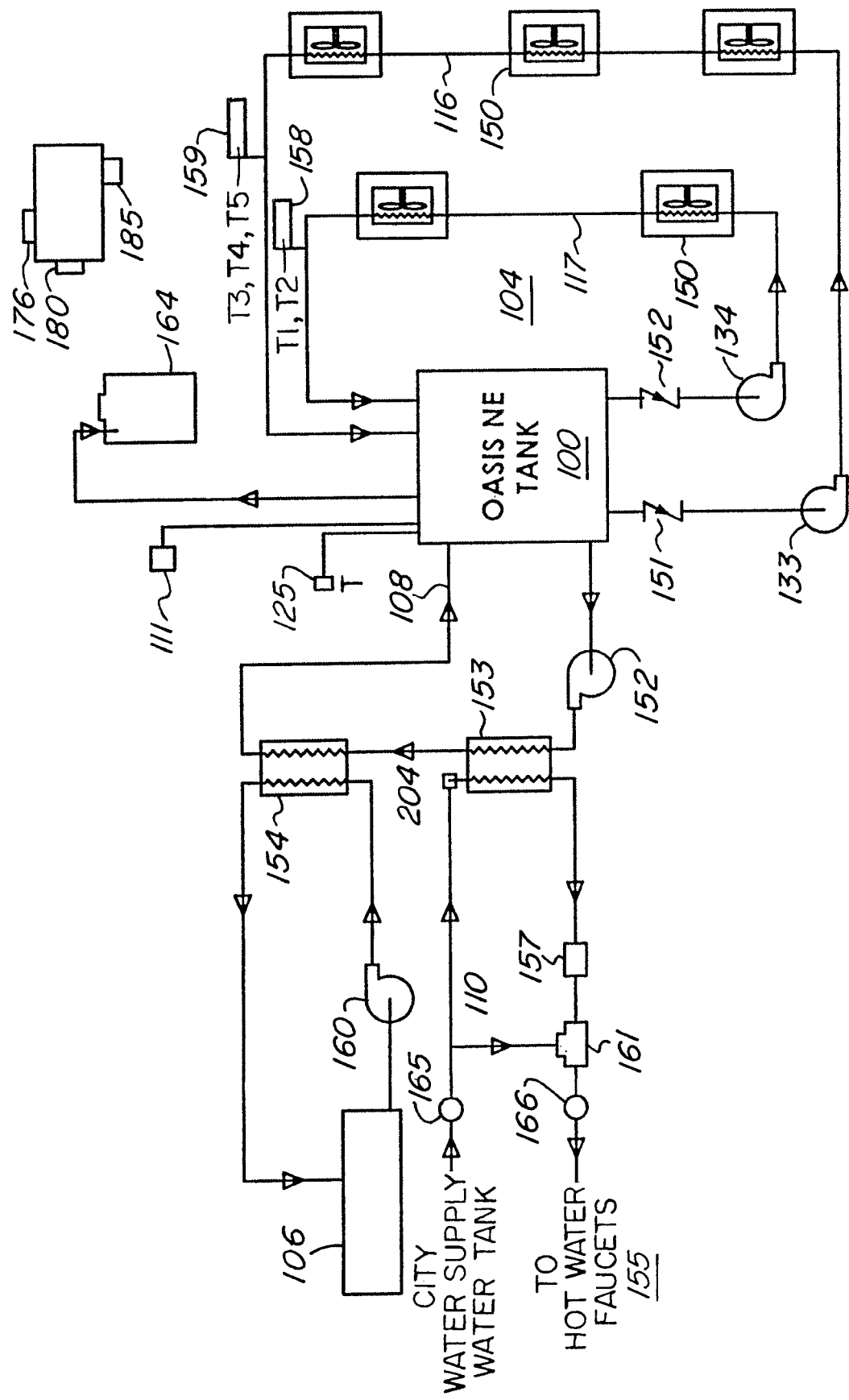
FIG. 4 is a diagrammatic partial isometric view of the potable water and coolant circuits associated with the auxiliary heater of FIG. 2A.
Figure 5:
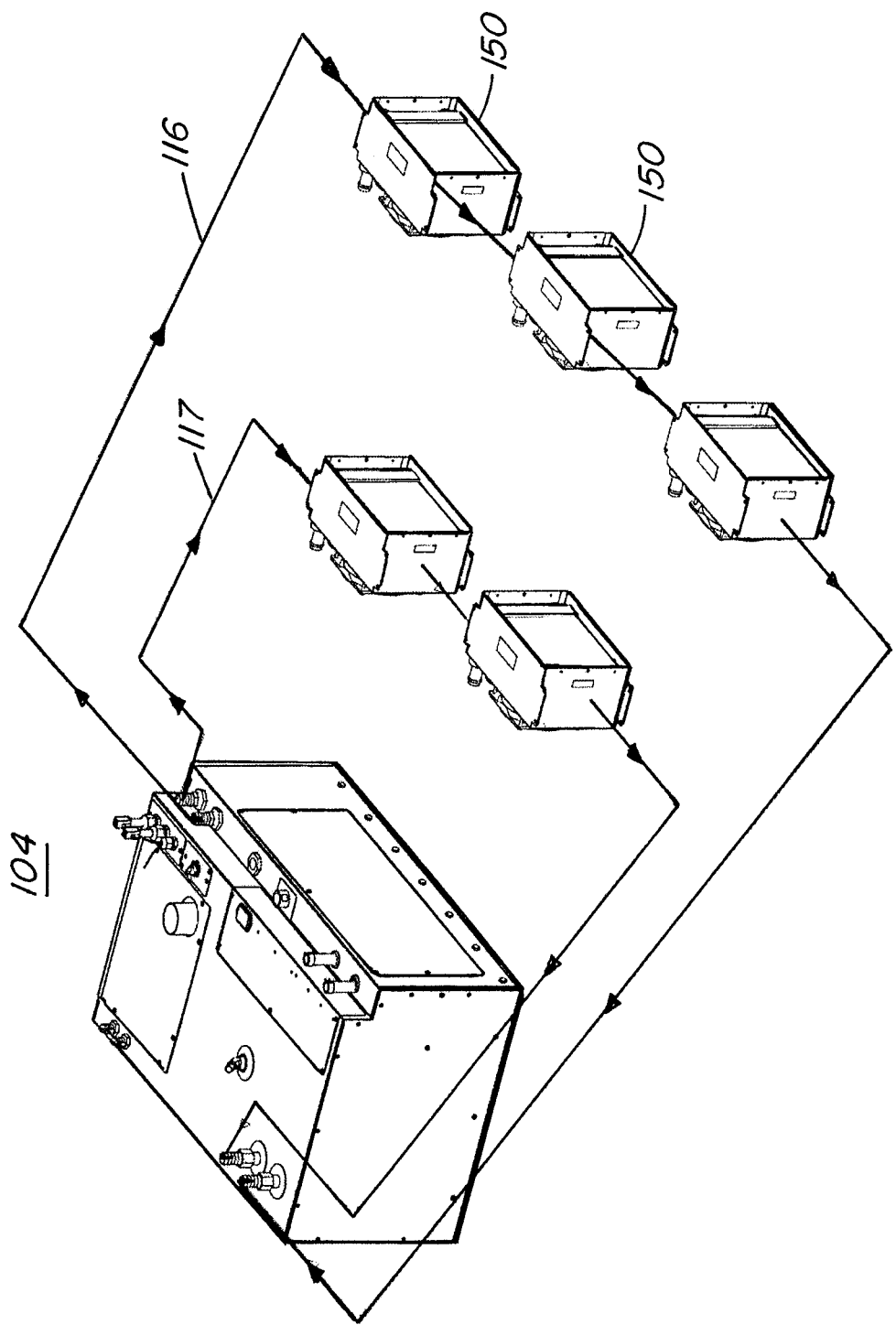
FIG. 5 is a diagrammatic partial isometric view of the two coolant circuits with their zone heating fans which are associated with the auxiliary heater of FIG. 2A.

There are four (4) principal systems which comprise the auxiliary heater 100, namely the burner assembly generally illustrated at 102 (FIG. 2A), the coolant tank assembly generally illustrated at 103, the coolant circuit and its associated operating components generally illustrated at 104 (FIGS. 4 and 5) and the potable or fresh water circuit and its associated operating components generally illustrated at 110. The coolant circuit 104 is under the control of a zone control board 185 (FIG. 4). The burner assembly 102 is under the control of a control board 111.

FIG. 2A more clearly illustrates the burner assembly 102. It comprises a burner box 112 with an opening (not illustrated) in one wall 115 of the burner box 112 which allows ambient air entering the combustion fan 113 through an inlet duct 114 to access the burner box 112. It will be appreciated that although the burner box 112 is illustrated in its open position in FIG. 2A, there will be an additional front plate (not illustrated) attached to the burner box 112 when the auxiliary heater 100 is under operation thereby to confine the combustion air to the burner box 112 and to the burner tube 244 (FIG. 2B) for combustion purposes. It will be further appreciated that the burner assembly 102 illustrated in FIG. 2B, while being of the same general construction as that illustrated in FIG. 2A, is a higher output burner assembly which utilises additional components to enhance the power output as will be described.

A compressor 120 is also attached to the wall 115 of the burner box 112. The compressor 120 is connected to the nozzle (not illustrated) by way of a duct or tube 121 which extends from the outlet of compressor 120 through sidewall 115 of the burner box 112 and thence to the nozzle holder 132 (FIG. 2B). The tube 121 is connected to the outlet of the compressor 120 and provides air under pressure to the nozzle holder 132 and thence to the nozzle. The inlet side 122 of the compressor 120 takes in air from inside the casing 101 (FIG. 1B) through a filter 123. The compressor 120 is of the reciprocating type with a movable diaphragm which acts to take the air in during the intake or suction stroke of the compressor 120 through the filter 123 and expels the air through tube 121 to the nozzle holder 132 and thence to the nozzle during the exhaust stroke of the compressor 120.

The auxiliary heater 100 is conveniently a diesel fuel burning heater and fuel is provided to the nozzle holder 132 and thence to the nozzle from a fuel pump 124 best illustrated in FIG. 2B which pumps diesel fuel from a fuel tank 124 (FIG. 4) located remotely from the auxiliary heater 100. The fuel passes to a fuel regulator 130 (FIG. 2A) which, in turn, is connected to a solenoid 126 (FIG. 2B) and thence to the nozzle holder 132 and to the nozzle. It will be appreciated that the fuel system is of the low pressure aspirated type; that is, the air provided by compressor 120 to the nozzle holder 132 creates a suction within the nozzle thereby to allow the fuel regulator 130 to open and to admit the necessary fuel for combustion to pass to the solenoid 126 and thence to the nozzle by way of nozzle holder 132 where the fuel is atomized by the compressed air provided by the compressor 120 thereby allowing combustion of the atomized fuel within the presence of combustion air provided by the combustion fan 113 within the combustion chamber 244 conveniently in the form of a burner tube or cylinder. Any fuel not required for combustion is returned to the fuel tank.

A flame sensor 127 is included in the burner assembly 102. The flame sensor 127 focuses on the combustion flame within the burner tube or combustion chamber 244 during burner operation. The presence of a flame will send a pulsing signal to the control board 111. When the flame is extinguished, the signal will stop and the control board 111 will terminate the burner operation thereby to stop any remaining non-combusted fuel being provided to the burner assembly 102. Termination of the burner operation is done by terminating the operation of compressor 120, fuel pump 124 and fuel solenoid 126.

An igniter 135, best seen in FIGS. 2B and 2D, ignites the combustion air and fuel emitted by the nozzle. The control board 111 provides power to the igniter 135 which commences the operation of an infrared element in the area of nozzle emission. The infrared element ignites the fuel/air mixture emitted by the nozzle.

Figure 3:
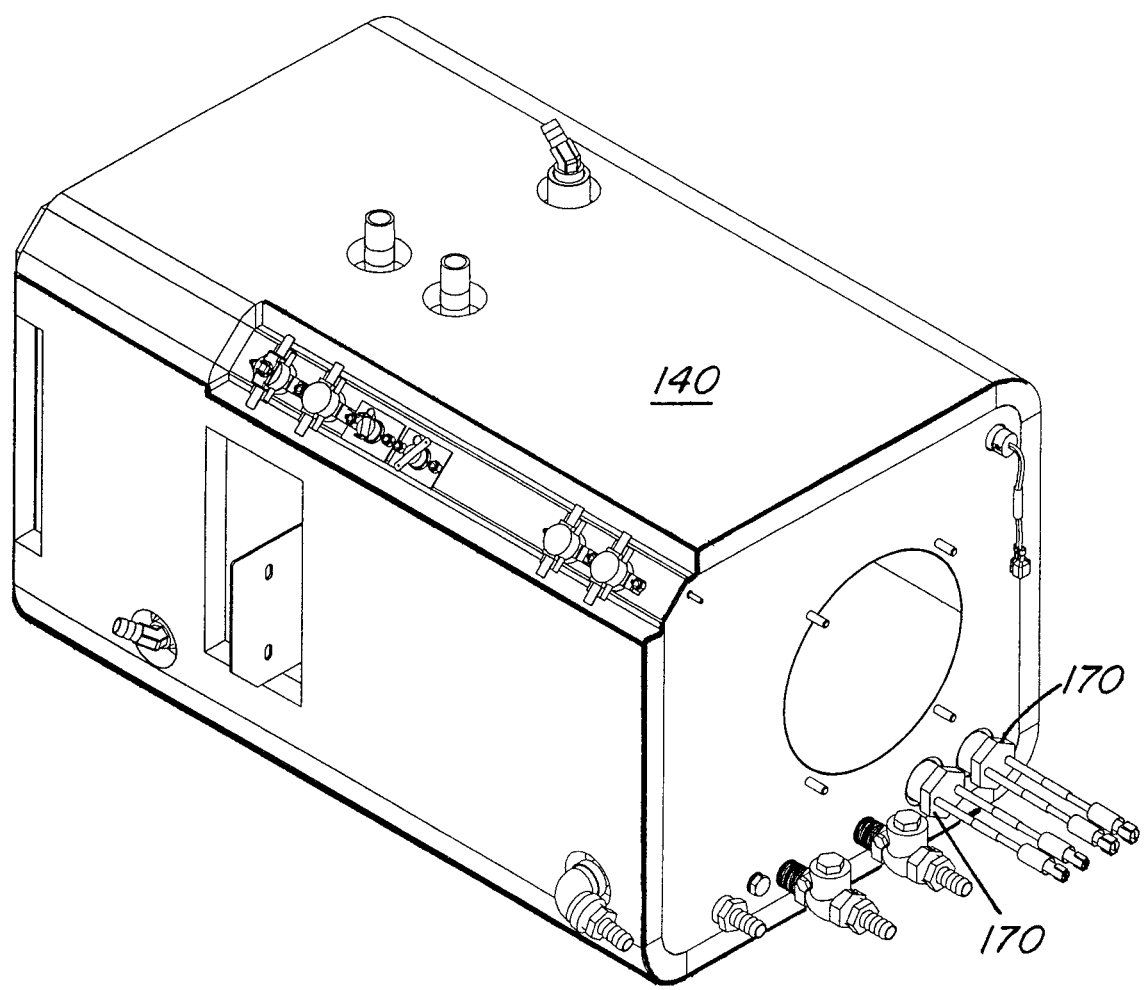
FIG. 3 is a diagrammatic isometric view of the coolant tank and its associated components which coolant tank is used in the auxiliary heater of FIG. 2B.

The coolant circuit 104 (FIG. 4) includes two coolant pumps 133, 134 (also shown in FIG. 2A) which are connected to the coolant tank generally illustrated at 140 located within the heater casing 101. Each of the coolant pumps 133, 134 is connected by way of hoses 141, 142, respectively, which are connected to loop supply fittings 143, 144 extending directly from the coolant tank 140 as best seen in FIG. 3. The loops 116, 117 extend through the cabin fans 150 and return to the coolant tank 140 through fittings 148, 149 (FIG. 2A). Tank fitting 145 (FIG. 3) is used to allow coolant from an external source 169 (FIG. 7) to be supplied to the coolant tank 140 when the coolant tank 140 is initially filled with coolant as will be described.

Each coolant loop 116, 117 extends through respective zones (FIG. 1A) within the motorhome 105 and each zone is dependent on independent thermostats 158, 159 (FIG. 4) which, when indicating a call for heat, control the circulation of coolant through the zones 116, 117 by way of switching the pumps 133, 134 on or off according to the desire by the user for heat in the respective heating zone. The loop2 and loop1 coolant circuits 116, 117, respectively, each include one or more cabin fans 150. Each of the cabin fans 150 includes a radiator. A fan blows air over the radiator thereby to heat the area in the zone through which the loops 116, 117 pass. Respective check valves 151, positioned in each loop 116, 117, respectively, maintain the coolant flow in a single direction and prevent reverse flow in a loop that does not have its pump 133, 134 in operation.

Figure 6:
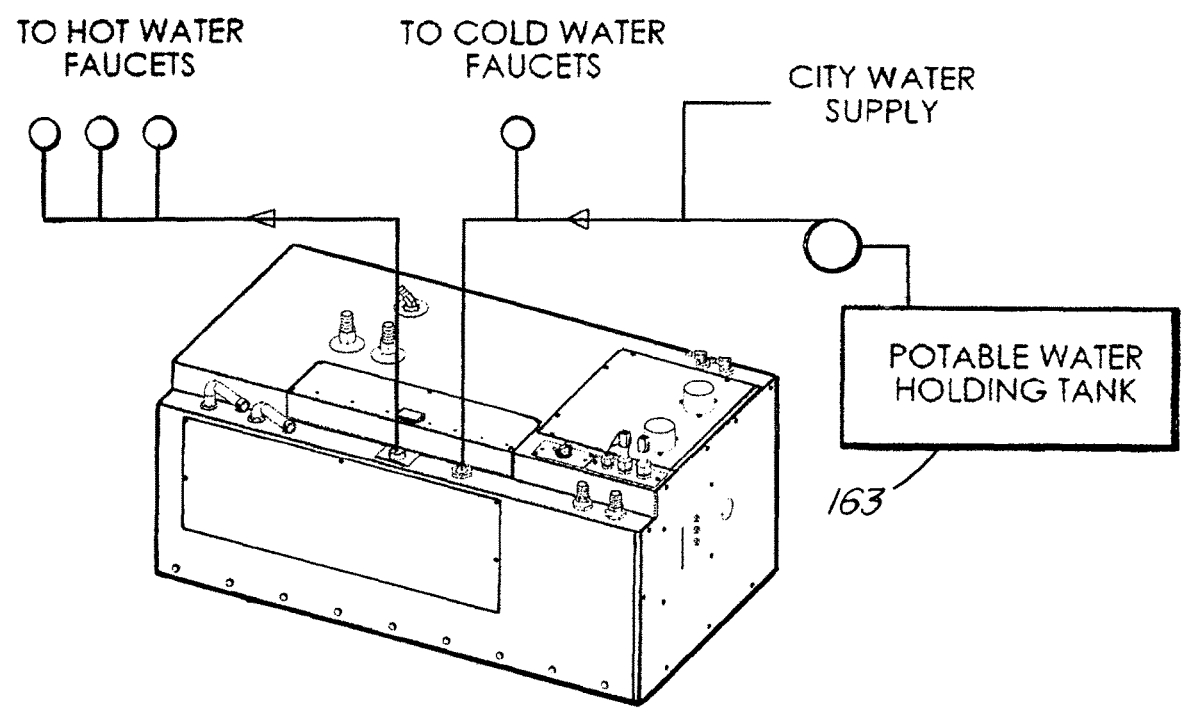
FIG. 6 is a diagrammatic partial isometric view of the potable water circuits associated with the auxiliary heater of FIG. 2A.

A third pump 152 (FIGS. 2A and 4) is provided for a third coolant loop 108. Pump 152 provides hot coolant fluid through a first heat exchanger 153, conveniently a twenty (20) plate heat exchanger and, thence, through a second heat exchanger 154, conveniently a fourteen (14) plate heat exchanger. Heat exchanger 153 is used to exchange heat between the hot coolant and the potable water circuit 110 which provides hot water to the hot water faucets 155 (FIGS. 1 and 4) of the motorhome 105. Heat exchanger 154 (FIG. 4) will exchange heat with the engine coolant when the engine coolant is moving through heat exchanger 154 under the influence of engine pre-heat pump 160. Such a pump 160 may be used, for example, to heat the diesel engine 106 of the motorhome 105 in cooler weather prior to startup of the engine 106. A mixing valve 161 (FIG. 2A) is provided to mix the heated water from heat exchanger 153 with the cold water coming from the city water supply or motorhome water tank 163 (FIG. 6) located elsewhere on the motorhome 105 thereby to ensure that the water released from the hot water faucets 155 is not scalding. A cold potable water inlet fitting 166 and a hot potable water outlet fitting 165 are provided (FIG. 2A). A flow switch 157 is positioned between the cold potable water inlet fitting 166 and the tee before the mixing valve 161 and heat exchanger 153 so that the full flow of hot water can be monitored. A potable water aquastat 204 (FIG. 2A) is mounted on the coolant tank 140. The operation of the flow switch 157 and the potable water aquastat 204 will be described.

An internal engine pump (not illustrated) may provide engine heat to the coolant of the auxiliary heater 100 through the engine coolant if the engine 106 is running thereby to maintain the tank coolant in its heated condition without the operation of the burner assembly 102 thereby conserving diesel fuel while still allowing full heating of the coolant in the coolant tank 140. The engine preheat pump 160 will not be operable when the engine 106 is running.

Figure 7:
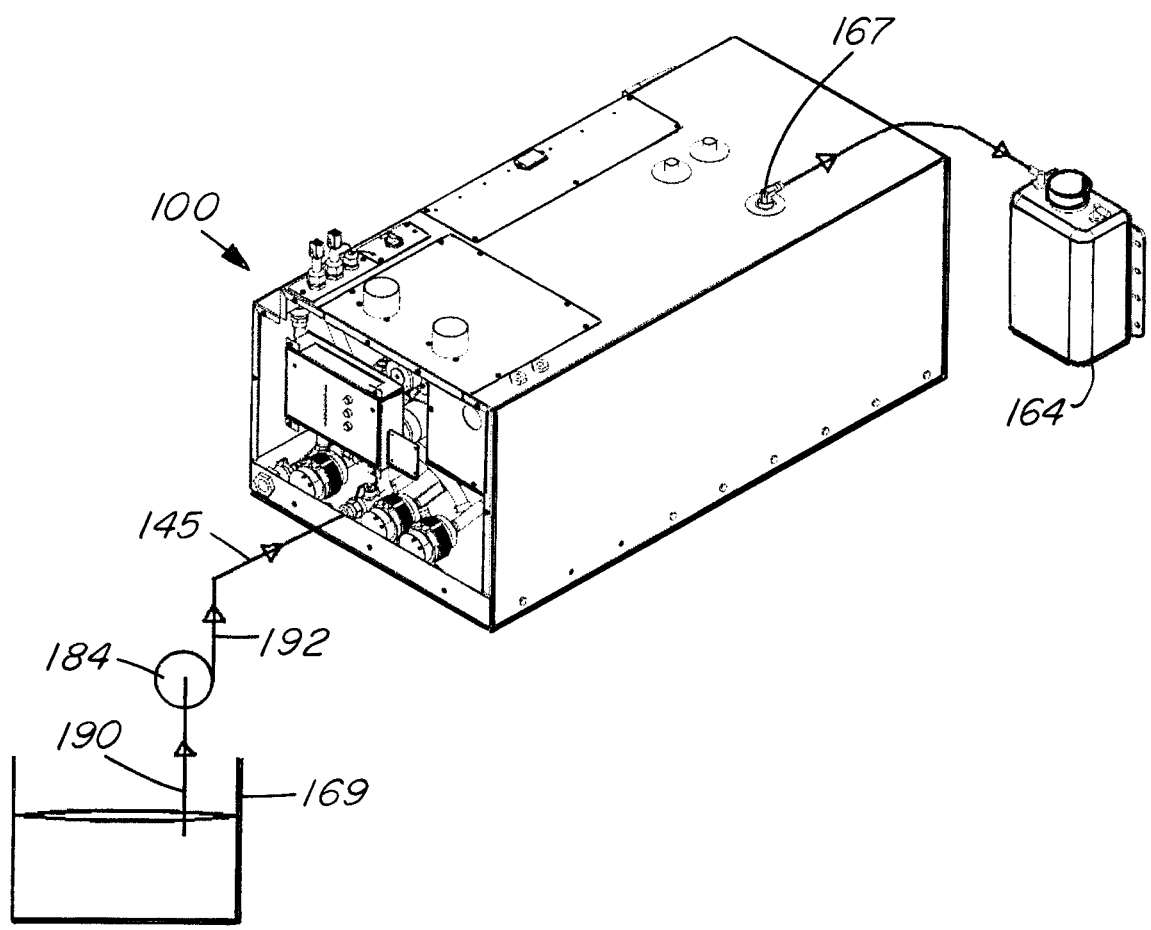
FIG. 7 is a diagrammatic isometric view of the auxiliary heater according to FIG. 2A together with the overflow bottle particularly illustrating the filling and purging operation when initially filling the auxiliary heater with coolant or when replacing the coolant.

An overflow bottle 164 (FIG. 7) is connected to the auxiliary heater 100 by way of overflow outlet fitting 167 (FIGS. 1B and 7). The overflow bottle 164 allows for coolant expansion and contraction and further allows for the addition of coolant in the event of leakage or evaporation. A level switch 200 is installed in the coolant tank 140 (FIG. 2A). The level switch 200 terminates operation of the coolant pumps 133, 134, 152 if there is insufficient coolant in the coolant tank 140. This prevents the coolant pumps 133, 134, 152, 160 from running dry due to insufficient coolant.

A pair of electric elements 170 (FIG. 2C) are provided in the coolant tank 140. The electric elements 170 are located within the interior of the coolant tank 140 and, when operated, act to maintain the coolant in the tank 140 in a heated condition generally without the necessity of burner operation such as at night in order to reduce any unnecessary combustion noise and to conserve diesel fuel when there is a minimal call for heat from the coolant.

Figure 8:
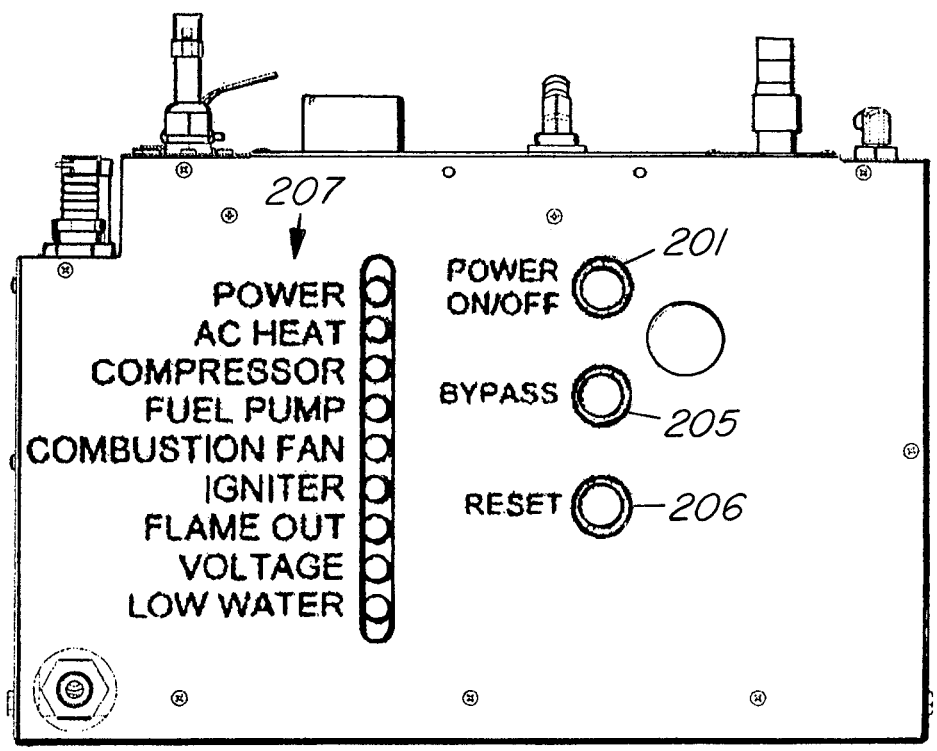
FIG. 8 is a diagrammatic front view of the auxiliary heater of FIG. 2A particularly illustrating the heater controls including the power and bypass switches as well as the LED lights used for diagnostics.
Figure 9A:
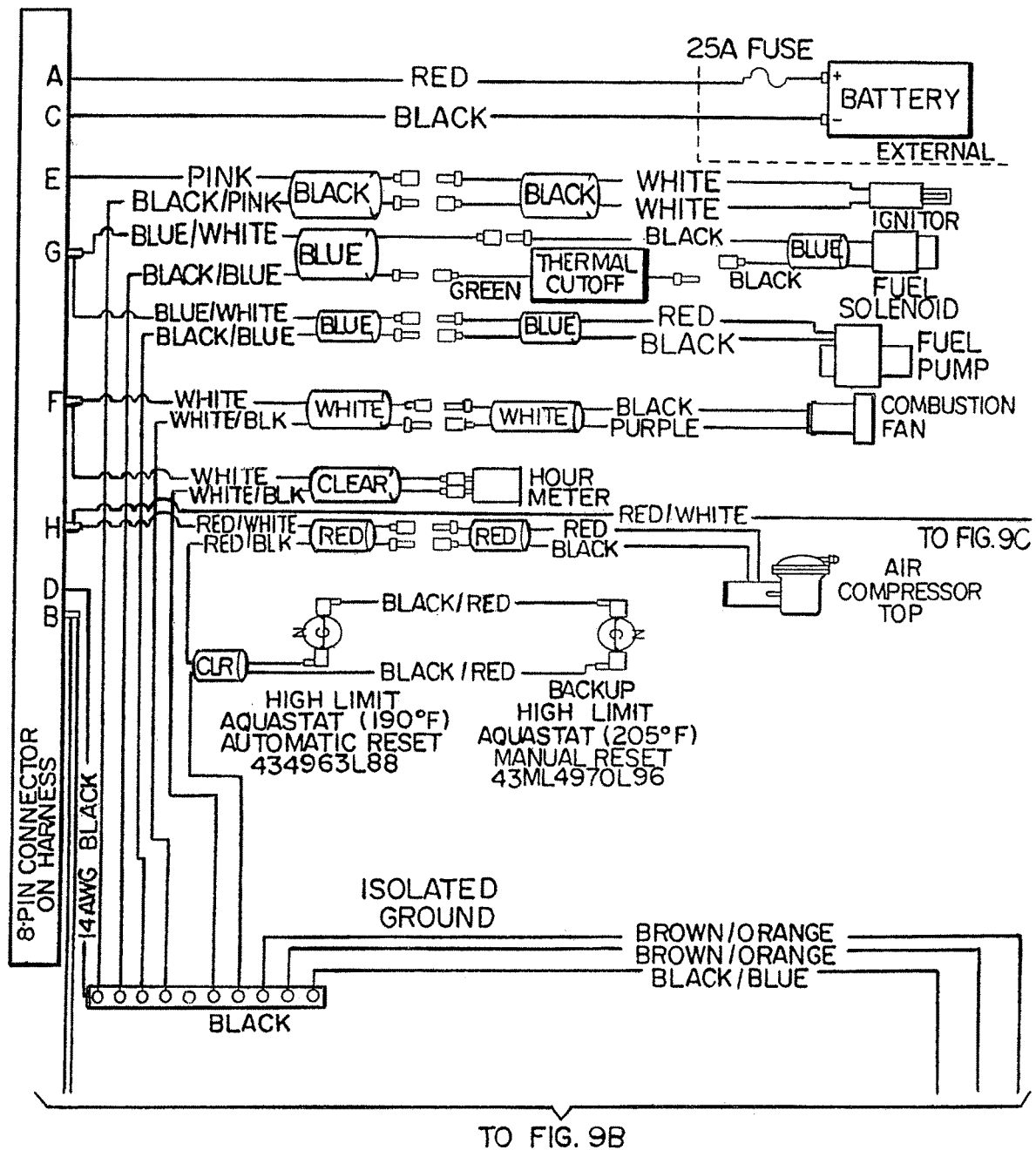
FIGS. 9A-9C are schematic reviews of the wiring of the first embodiment of the auxiliary heater according to the invention.
Figure 9B:
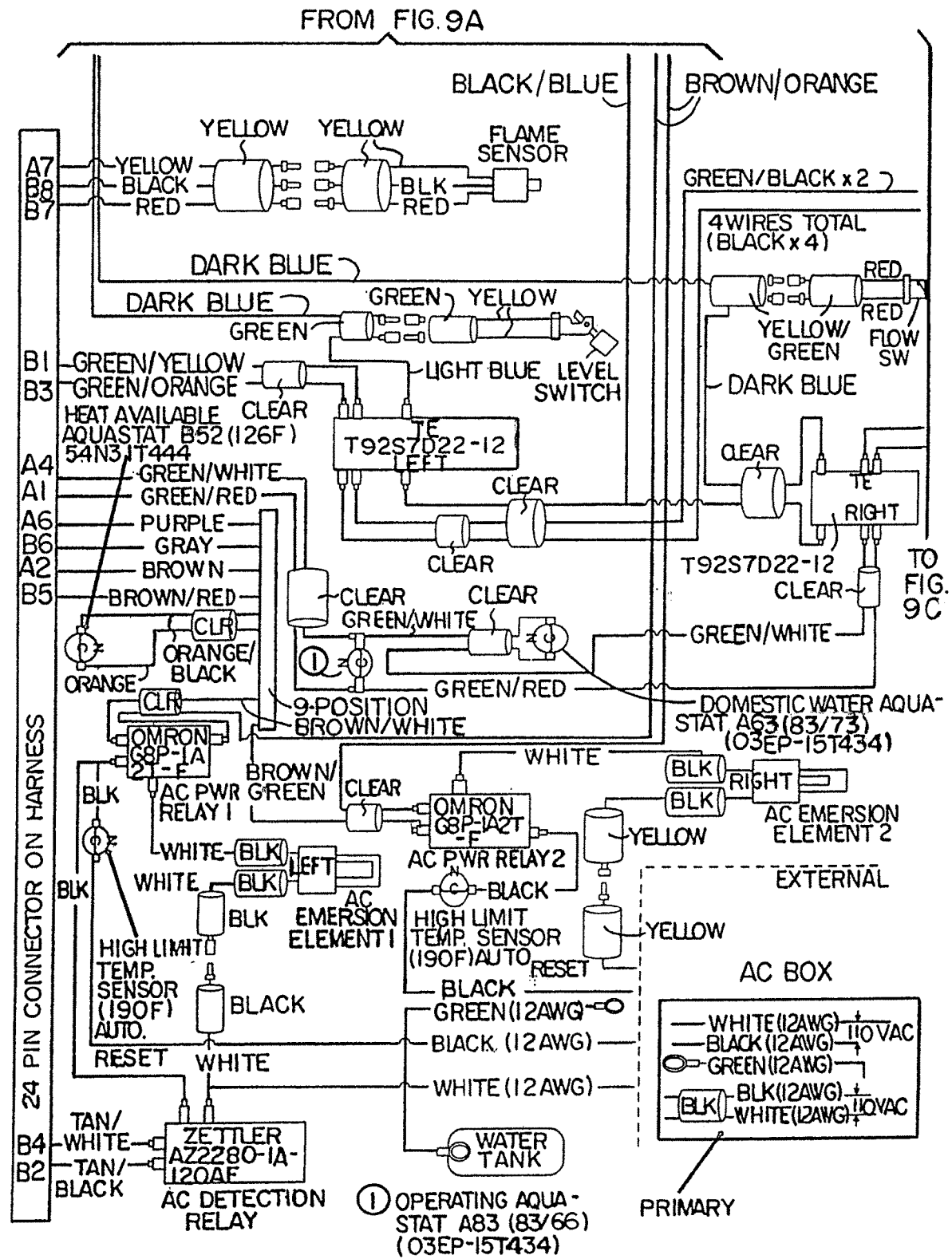
Figure 9C:
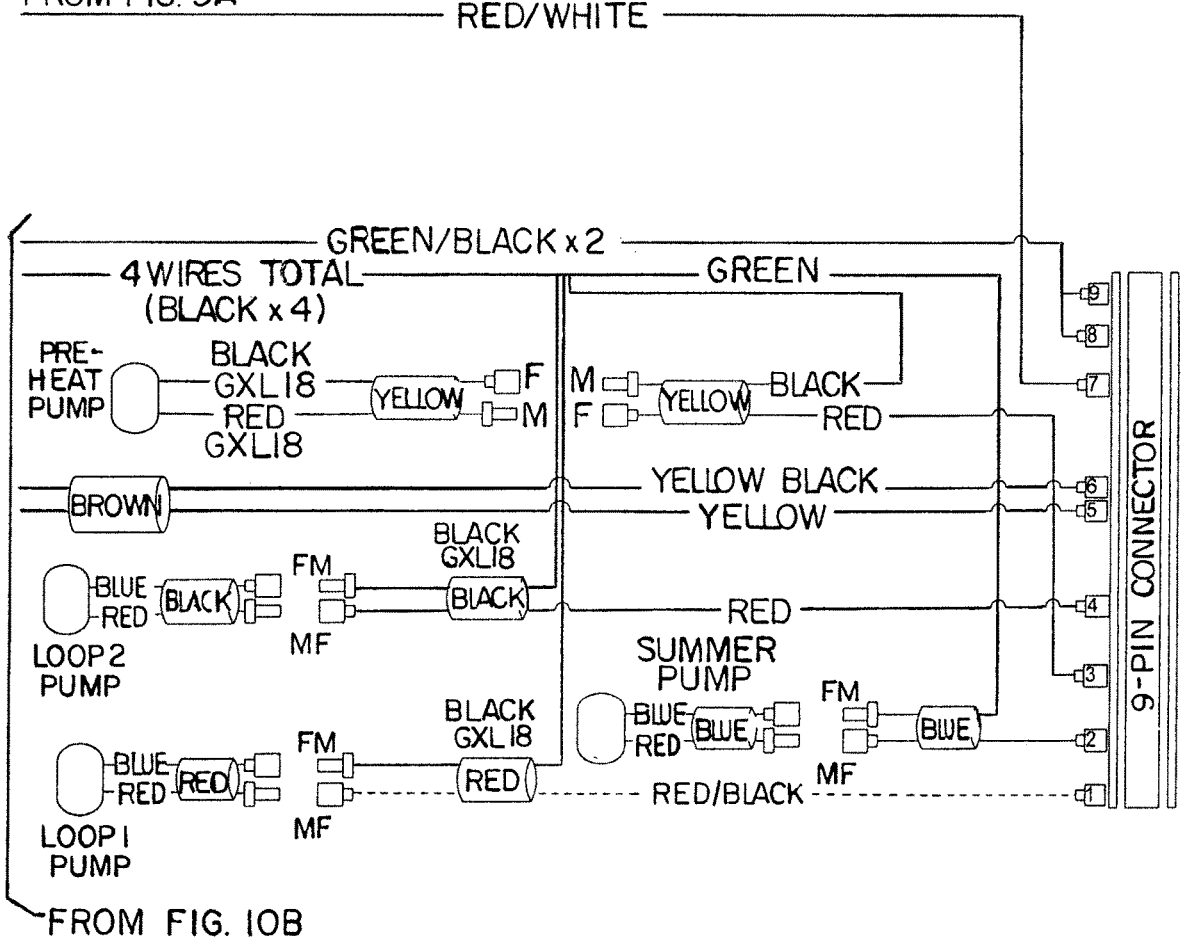
Figure 10A:
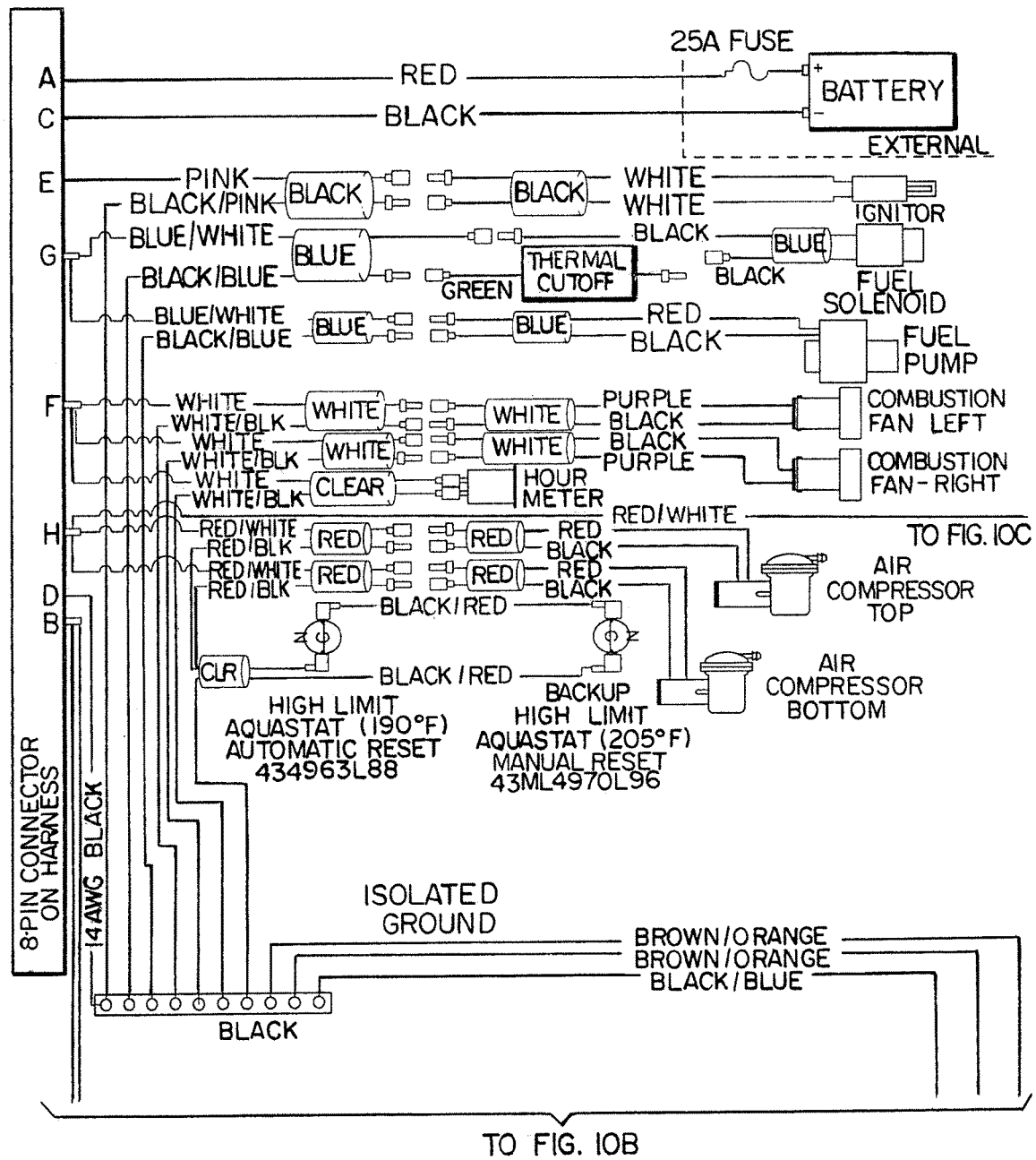
FIGS. 10A-10C are schematic reviews of the wiring of the second embodiment of the auxiliary heater according to the invention.
Figure 10B:
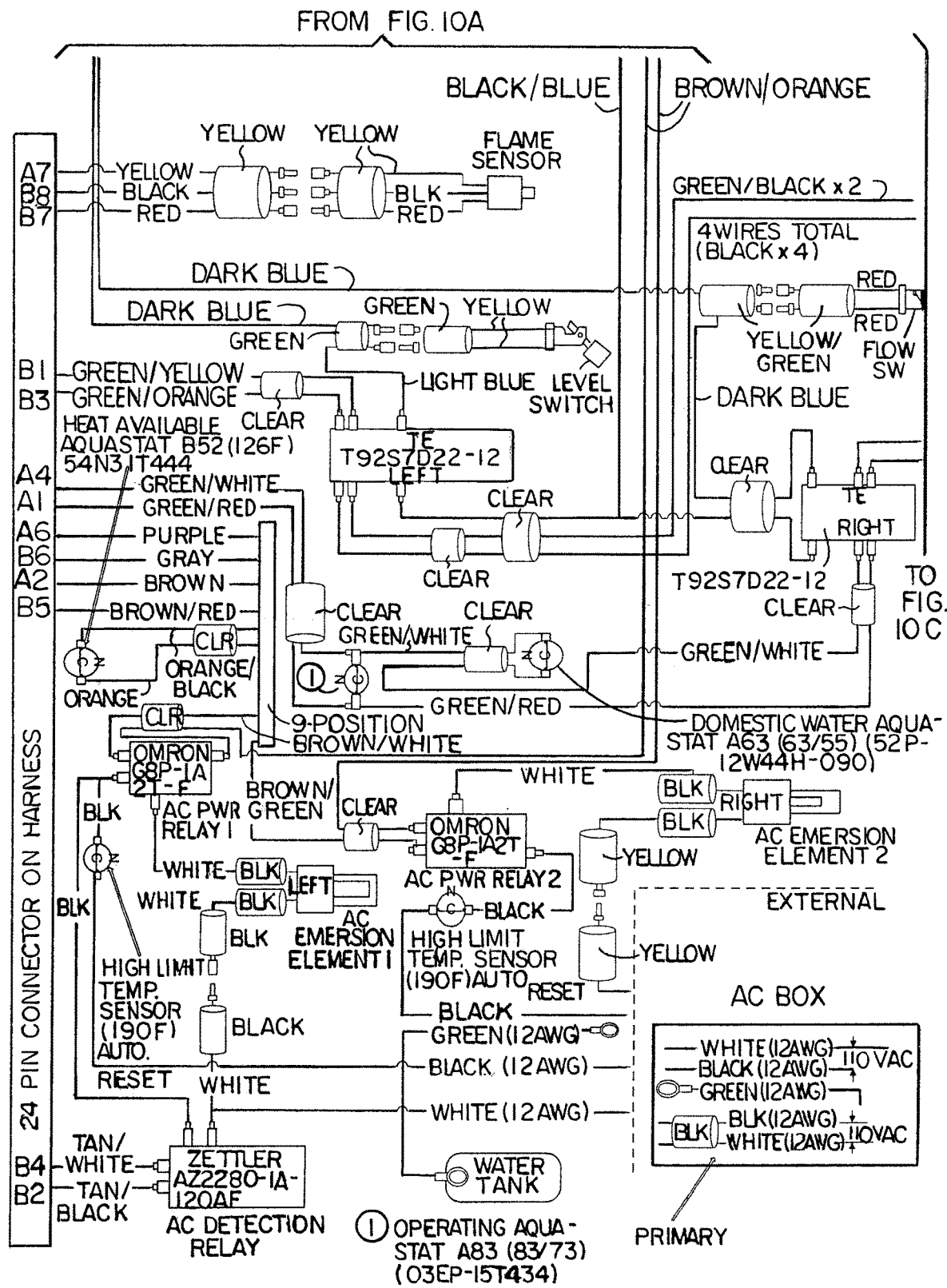
Figure 10C:
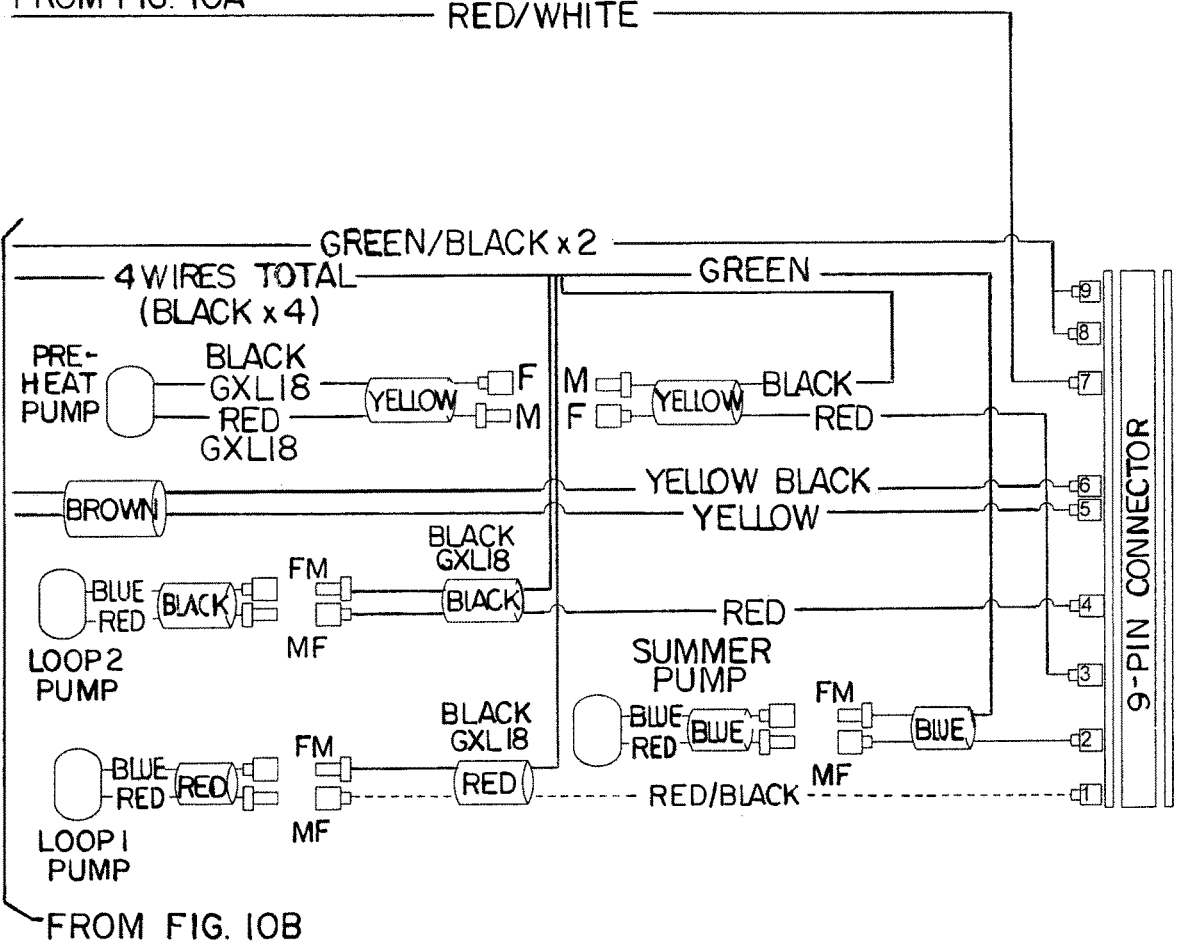

The control board 111 for the auxiliary heater 100 is shown diagrammatically in FIG. 4 and the controls themselves which are operably connected to the control board 111 are shown in FIG. 8. A remote switch 175 controls the ON/OFF condition of the burner 102, the electric elements 266, 267 and the engine pre-heat pump 160. An aquastat assembly is generally illustrated at 171 (FIGS. 2A and 2C). The aquastat assembly 171 is positioned on the upper portion of the coolant tank 140 and provides appropriate signals to the control and zone boards 111, 185 (FIG. 4). Seven (7) aquastats are located in this area. High limit aquastat 220 has an open condition at approximately 190 deg. F. Safety aquastat 221 has a closed condition at approximately 205 deg. F. High limit and safety aquastats 220, 221 are located in the upper portion of the tank 140 where the temperature of the coolant is the highest. The high limit and safety aquastats 220, 221 are wired in series with the compressor 120. In the event either of the aquastats 220, 221 sense a temperature exceeding their respective open positions, the contacts within the aquastats 220, 221 will open. This will terminate power to the compressor 120 which will terminate fuel delivery to the nozzle holder 132 and its nozzle and extinguish any flame in the burner assembly 102. A heat available aquastat 203, a cycling aquastat 202 and a potable water aquastat 204 are also mounted on the coolant tank 140. The heat available aquastat 203 will close at 52 deg. C. of 125 deg. F. The heat available aquastat 203 is connected to the zone board 185. When the heat available aquastat 203 is closed, it will input to the zone board 185 that the coolant temperature is at a temperature of at least 125 deg. F. If there is then a call for space heating, potable hot water or engine pre-heat, the zone board 185 will respond by running the appropriate coolant pumps 133, 134, 152, 160 and/or cabin fans 150. If the heat available aquastat 203 is open indicating a coolant temperature of less than 125 deg. F., none of the coolant pumps 133, 134, 152, 160 and cabin fans 150 will operate. Two further high temperature aquastats 214, 215 are associated with the two electric elements 170. Aquastats 214, 215 will open at 190 deg. F. and terminate operation of the electric elements 170 if the cycling aquastat 202 fails to terminate operation of the electric elements 170.

Operation

In operation and following placement and installation of the auxiliary heater 100 in the motor coach 105, the auxiliary heater 100 needs to be initially filled with coolant and reference is made to FIG. 7. A filling and purge self-priming portable pump 184 has an inlet hose 190 which is placed in source of tank coolant 169 and an outlet hose 192 which is manually connected to tank fitting 145 (see also FIG. 2A) with the position of the valve 145 being open as illustrated to allow the coolant to pass to the coolant tank 140. An overflow bottle 164 is connected to the fitting 167 (FIGS. 1B and 7). The user will commence operation of the self-priming pump 184 and will observe the coolant movement until the coolant flows into the overflow bottle 164. The pump bypass switch 176 located on the top of zone board 185 is then turned on which seeks to initiate operation of the three (3) coolant pumps 133, 134, 152. The level control switch 200 in the coolant tank 140 senses whether there is sufficient coolant in the tank 140 and if there is sufficient coolant, the operation of the coolant pumps 133, 134, 152 will commence which allows the tank coolant to fill all of the coolant lines 116, 117, 108. If the level of coolant within the coolant tank 140 drops below the desired level as indicated by the level control switch 200, the coolant pumps 133, 134, 152 as well as the engine pre-heat pump 160 will cease operation thereby preventing the pumps 133, 134, 152 from running dry without coolant which condition can cause heat buildup and pump seizing.

As the coolant fills the coolant lines 116, 117, 152 and coolant tank 140, the desired level of fluid within the overflow bottle 164 is reached. The filler pump 184 is turned off. The coolant pumps 133, 134, 152 continue to run until all air is purged from the system and the coolant level in the overflow bottle 164 is seen to remain constant. The pump bypass switch 176 is turned off and the coolant pumps 133, 134, 152 will cease operation. The shut off valve connected to the tank fitting 145 is rotated to the OFF position where it remains so long as the system is full of coolant. The auxiliary heater 100 is then ready for the commencement of normal operation with a tank of cool coolant.

The auxiliary heater 100 will remain in the condition of full (and cool) coolant without power until the power switch 201 (FIG. 1B) is activated to turn on the auxiliary heater 100 and the burner switch on the remote 175 is similarly turned on.

With the power switch 201 activated and power being applied to the auxiliary heater 100 and with the burner switch on remote 175 also turned on, the cycling aquastat 202 (FIG. 2A) senses the cool temperature of the coolant in the recently filled coolant tank 140 and, being in its closed position, instructs the burner assembly 102 through control board 111 to commence operation. The igniter 135 will commence operation. After ten (10) seconds, the combustion fan 113 will supply combustion air to the burner box 112 and the combustion chamber of the burner assembly 102 through air intake holes 222 (FIG. 2C). The fuel pump 124 will pump fuel to the fuel regulator 130 and the solenoid 126 (FIG. 2B) will open to allow the fuel from the fuel pump 124 and fuel regulator 130 to travel to the nozzle in the nozzle holder 132. The operation of the compressor 120 is initiated which will provide air under pressure to the nozzle through nozzle holder 132 and air tube 121. Combustion will commence when the atomised fuel emanating from the nozzle contacts the fuel igniter 135. The igniter 135 will terminate operation twenty (20) seconds from commencement of igniter operation.

As combustion continues, the coolant within the coolant tank 140 will increase in temperature until the cycling aquastat 202 reaches its upper temperature limit whereupon it opens and terminates operation of the burner assembly 102. The combustion fan 113 continues operation for a predetermined time period to cool the burner assembly 102 and to exhaust all combustion gases. The coolant in the tank 140 is ready for a call for heat from the user.

If the call for heat comes from a thermostat 158 covering loop 117 or thermostat 159 covering loop 116, the heat available aquastat 203 is interrogated to ensure that there is heat available within the coolant in the coolant tank 140 so that cold air does not come from the cabin fans 150. Assuming that the heat available aquastat 203 is closed thereby indicating coolant heat is available and assuming the level switch 200 in the coolant tank 140 indicates there is sufficient supply of coolant, coolant pumps 133 and/or 134 will commence operation and will pump hot coolant from the tank 140 through the coolant loops 117, 116. Simultaneously, the cabin fans 150 will turn on and provide warm or hot air to the environment monitored by the respective one of thermostats 158, 159 until the temperature indicated by thermostat 158 reaches its desired value and opens thereby terminating operation of the coolant pumps 133, 134.

As the hot coolant leaves the coolant tank 140 and is circulated through the heating loops 116, 117, heat will be depleted from the coolant and the coolant temperature will fall. The cycling aquastat 202 senses the coolant temperature and when the coolant temperature falls to the predetermined value, conveniently 66 deg. C., cycling aquastat will close and the burner assembly 102 will commence combustion. This will heat the coolant in the tank 140 until it reaches the upper limit of the cycling aquastat 181 at approximately 180 deg. F. whereby it opens and a signal to the burner assembly 102 will terminate combustion as described.

The user may call for hot water from any of the several hot water faucets 155 (FIG. 1A) in the motorhome 105. If there is a call for hot water from any or all of the hot water faucets 155, water will begin to move through potable water circuit 110 and heat exchanger 153. The flow switch 157 will sense the potable water movement and will close and the pump 152 will commence to pump coolant through the heat exchanger 153 assuming the heat available aquastat 203 indicated there is heated coolant available. The potable water aquastat 204 connected to the coolant tank 140 will sense the temperature of the coolant tank 140 and as heat is drawn from the coolant, aquastat 204 will close after a certain period when the temperature of the coolant is falling and the burner assembly 102 will then commence operation.

If the flow switch 157 indicates potable water flow and the heat available aquastat 203 indicates there is heat available in the coolant in the tank, the tank coolant will commence to flow through the heat exchanger 153 and will heat the water passing through the heat exchanger 153 by the operation of pump 152. The pump 152 will continue to operate and hot coolant continues to circulate through the heat exchanger 153 thereby heating the heat exchanger 153 and the potable water aquastat 204 attached thereto until the temperature of the heat exchanger 153 increases and the attached aquastat 204 assumes the open position whereby the summer pump 152 ceases operation.

This normal operation, however, is disadvantageous in certain applications such as when a full flow request for hot water is received such as when the user is in a shower. In this case, the temperature of the hot coolant passing through the heat exchanger 153 may decrease without the burner being on and the temperature of the hot water may likewise decrease until the burner commences operation. The user therefore may feel a short temperature decrease in his shower water.

To avoid this hot water temperature decrease, the flow switch 157 is added to the potable water circuit 110 between the heat exchanger 153 and the hot potable water outlet 106 in combination with a potable water aquastat 204 as will be explained. The flow switch 157 senses movement of the water in the potable water circuit 110 and immediately commences operation of the coolant pump 152 assuming that the heat available aquastat 203 indicates that there is hot coolant available in the coolant tank 140. Thus the movement of hot coolant through the heat exchanger 153 will commence and this coolant will heat the heat exchanger 153 and immediately pass heat to the potable water travelling through the potable water circuit 110.

As the hot coolant travels out of the coolant tank 140 through heat exchanger 153, the temperature of the coolant will decrease within the tank 140 because it is being replaced by cooler coolant without the burner operation. Thus, the heat transferred to the potable water within the heat exchanger 153 also decreases. If the call for hot water is low such as turning to a kitchen tap for a short period, there is no need for the burner assembly to commence operation and, therefore, the cycling aquastat 202 acceptably functions to initiate combustion within the burner assembly 102 if it is required. However, if there is a significant call for potable water such as for a shower, it is desirable to commence operation of the burner assembly 102 well before the cycling aquastat 202 closes in order to avoid a hot water temperature reduction prior to commencement of the burner assembly operation. The potable water aquastat 204 is therefore set to have a closed temperature which is higher than that of the cycling aquastat 202 to prevent a significant temperature decrease in the coolant. When the potable water aquastat 204 closes due to the temperature of the hot coolant dropping due to the significant call for hot water and with the flow switch 157 indicating hot water flow, the burner assembly 202 will commence operation thereby immediately heating the coolant and passing that heat to the potable water within heat exchanger 153. The burner assembly 102, however, will remain under the control of the domestic water aquastat 204 and if the tank coolant raises its temperature until the domestic water aquastat 204 reaches its open position, the burner assembly 102 will terminate operation. Control of the burner assembly 102 is then passed to the cycling aquastat 202 or, if there is another significant call for potable water, to the flow switch 157 and to the domestic water aquastat 202.

A further embodiment of the auxiliary heater is illustrated in FIG. 2B which auxiliary heater is generally illustrated at 240. In this embodiment, the power output of the auxiliary heater 240 is enhanced over the heater 100 of FIG. 1B with coolant tank 140. This is achieved by increasing the quantity of combustion air and the quantity and pressure of air coming from the compressor to the nozzle holder 132 and thence to the larger nozzle which will increase BTU output from the heater 100. This power increase allows the heater 240 to significantly increase the supply of hot coolant which will result in enhanced heat transfer to the potable water through heat exchanger 255 such that the flow required by an additional shower will be fully met by the increased power from the auxiliary heater 240 of FIG. 2B. Two (2) compressors 120 are utilized in this embodiment. The output of each of the compressors 120 are joined together to a single hose 251 and this single hose 251 extends to the nozzle holder 132 and to the nozzle extending therefrom. To achieve the increase in combustion air supplied to the combustion chamber 244, two combustion fans 241 are utilised although a single larger combustion fan would also be suitable. Each combustion fan 241 provides air to the burner box 243 and this air enters the combustion chamber 244 through the air supply holes 250. The enhanced combustion air emanating from the two (2) combustion fans 241 and the added compressor air supplied by the two (2) compressors 120 act to increase the BTU's generated by the burner assembly 102. To absorb this increased power, the volume of the coolant tank 252 is increased to approximately 14.5 gallons from the coolant tank 140 of the FIG. 2A embodiment which conveniently has a capacity of approximately 7.5 gallons of coolant. Further in this power enhanced auxiliary heater 240 and since the temperature decrease in the coolant from coolant tank 252 over time is less than the temperature decrease in the coolant over time from the coolant tank 140 in the lower power FIG. 2A embodiment which makes the aquastat less sensitive to tank coolant temperature change, the potable water aquastat 253 is mounted on the hot water outlet 261 from heat exchanger 255. The cycling aquastat 254, the heat available aquastat 260, the high limit aquastat 264, the safety aquastat 265 and the two (2) heating element high limit aquastats 266, 267 are all mounted on the coolant tank 252 as previously described in association with the FIG. 2A embodiment.

In operation, the auxiliary heater 240 of the second embodiment illustrated in FIG. 2B will operate very similarly to the earlier described auxiliary heater 100 according to the FIG. 2A embodiment. However, when a call for hot water is received from a user, the flow switch 262 will immediately initiate operation of the coolant pump 263 assuming that the heat available aquastat 260 indicates that the tank coolant is at a temperature of approximately 126 deg. F. or 52 deg. C. If the potable water aquastat 253 is in the open condition when the coolant pump 263 commences operation, the drop in potable water temperature over time to a value sufficient to close the potable water aquastat 253 and thereby commence operation of the burner assembly 102 will happen more quickly than if the potable water aquastat 253 was mounted on the top of coolant tank 252 with the remaining aquastats of the aquastat bank 171.

Yet a further embodiment of the invention relates to a switch 180 operably mounted to the zone board 185. The switch 180 is operable to allow the user to select the heating priority for the auxiliary heater 100. In a first position, the priority for the auxiliary heater 100 will be the production of hot water only and the operation of the coolant pumps 133, 134 will be terminated as well as the operation of any cabin fans 150 calling for heat while the coolant pump 152 continues operation thereby devoting the hot tank coolant entirely to the exchange of heat within heat exchanger 153 to the water within potable water circuit 110. This will enhance the continuous flow of hot water from heat exchanger 153.

In a second position, the priority between hot coolant used for space heating and hot coolant used for heating potable water is shared; that is, hot coolant will flow to heat exchanger 153 with coolant pump 152 in operation and, simultaneously, hot coolant will flow through coolant loops 116, 117 with coolant pumps 133, 134 in operation. The user may conveniently select either of the two switch position options.

Many modifications will readily occur to those skilled in the art to which the invention relates. For example, although aquastats are described as sensing temperatures, the control system could become much more precise with the replacement of the analog acting aquastats with digital acting thermistors, thermocouples and the like. Likewise and although the auxiliary heater has been described as being specifically designed for use in motorhomes, it is clear that the teachings of the invention would also apply to an auxiliary heater used in other vehicles, boats and shelters if desired.

Many further modifications to the specific embodiments described may readily be contemplated by those skilled in the art to which the invention relates and the specific embodiments described should be taken as illustrative of the invention only and not as limiting its scope as defined in accordance with the accompanying claims.

We claim:

1. Apparatus to heat potable water with coolant from a coolant tank located within a casing comprising a burner assembly including a burner to heat said coolant in said coolant tank, said casing holding said coolant tank and said burner assembly, a heat exchanger located externally of said coolant tank and within said casing, a first coolant circuit through said heat exchanger, a first potable water circuit through said heat exchanger, a first pump to move said coolant through said first coolant circuit in said heat exchanger, said heat exchanger exchanging heat between said coolant and said potable water, a first flow sensor to indicate potable water flow through said heat exchanger and to initiate operation of said first pump to pump said coolant through said heat exchanger, a second sensor to indicate the temperature of said coolant flowing through said heat exchanger, said second sensor being adapted to initiate operation of said burner when said first sensor indicates potable water flow and when said second sensor indicates said coolant temperature has dropped below a first predetermined value, and a third sensor to indicate the temperature change of said potable water, said third sensor initiating operation of said burner when said first sensor indicates potable water flow through said heat exchanger and when said temperature of said coolant drops below a second predetermined value, said second predetermined temperature value being higher than said first predetermined value.

* * * * *